May 24, 1938.  C. H. JOHNSON  2,118,514
DUPLICATING ROUTING MACHINE
Filed July 29, 1936   3 Sheets-Sheet 1
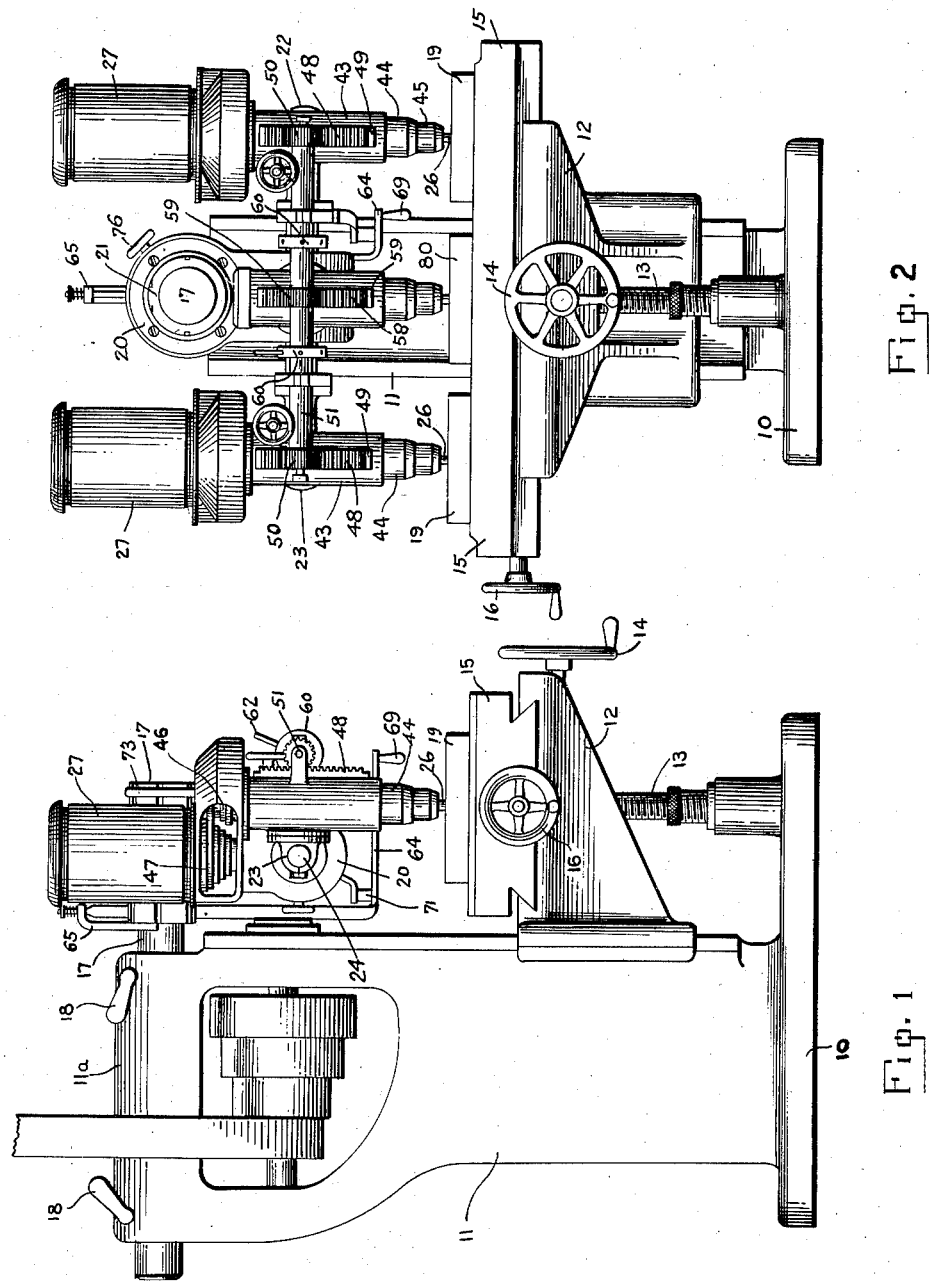
INVENTOR
Carl H. Johnson,
BY
ATTORNEY

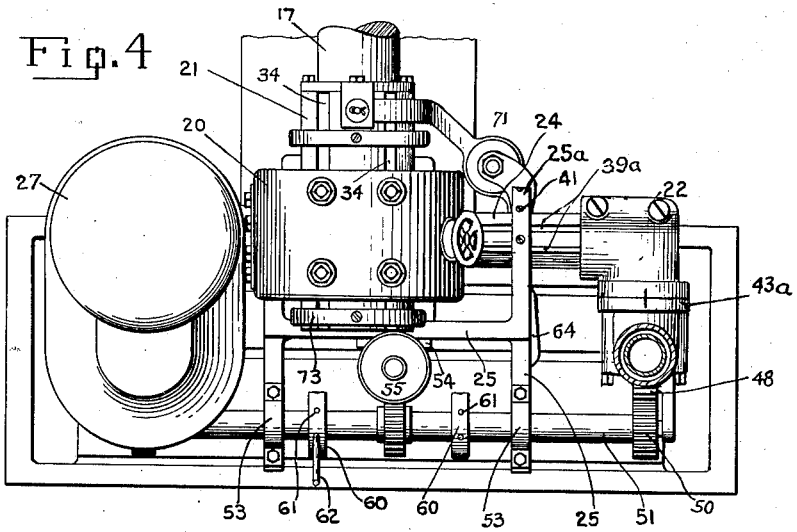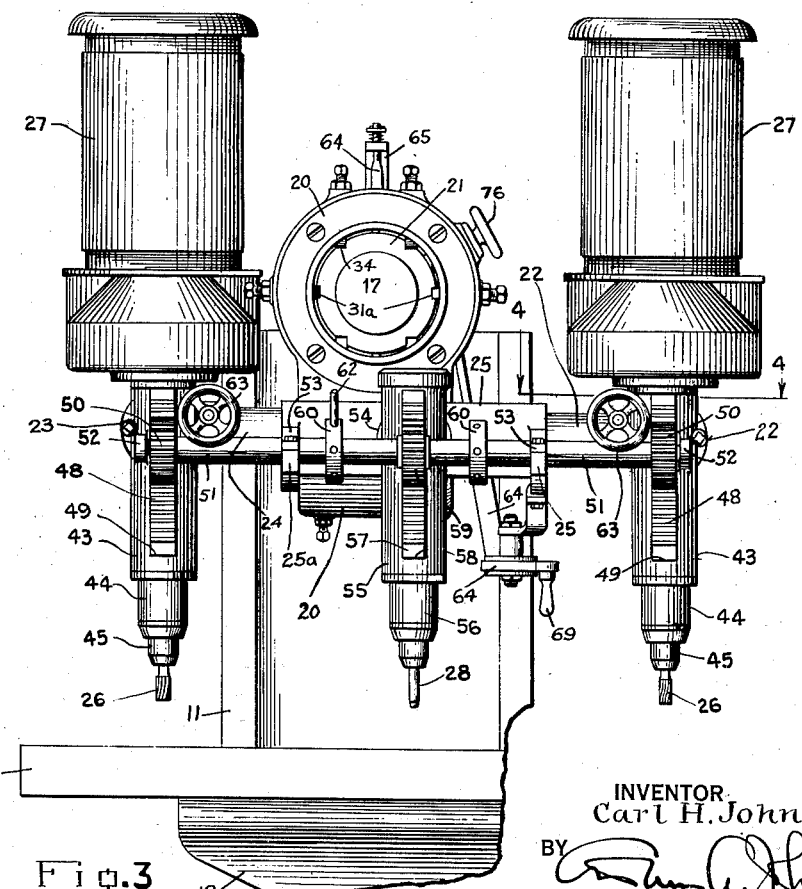

May 24, 1938.  C. H. JOHNSON  2,118,514
DUPLICATING ROUTING MACHINE
Filed July 29, 1936   3 Sheets-Sheet 3
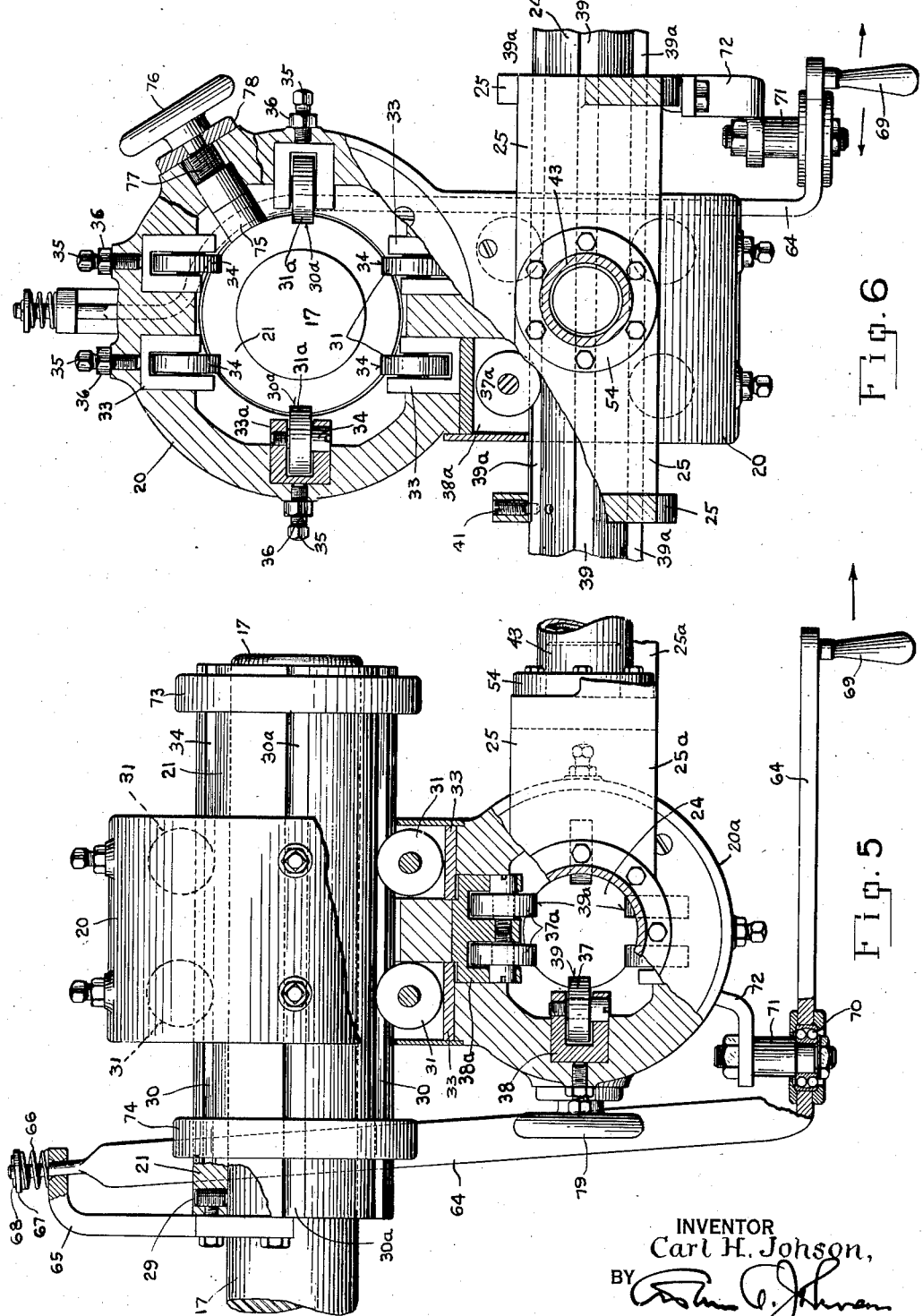
INVENTOR
Carl H. Johnson,
BY
ATTORNEY Patented May 24, 1938

2,118,514

UNITED STATES PATENT OFFICE 2,118,514

DUPLICATING ROUTING MACHINE

Carl H. Johnson, Bridgeport, Conn.

Application July 29, 1936, Serial No. 93,133

13 Claims. (Cl. 90—13.2)

This invention relates to duplicating routing or cutting machines for cutting or milling metallic or other articles to predetermined regular or irregular forms, in which the cutting parts are caused to follow lines of movement by means of a guide or stylus which traverses a fixed pattern.

In the past, various types of machines have been constructed for duplicating objects having variously shaped surfaces and contours. On the whole, these machines have been large and heavy of construction, and have required considerable floor space in the shop; in addition, the space taken by the machines has been for the most part not available for other use when the machine was not being used for its particular kind of work.

It is an object of the present invention to provide an improved and compact duplicating routing and cutting machine in the form of an attachment which can be readily mounted on a milling machine or the like, so that when the duplicating router is not used it can be quickly removed, and the milling machine used for other work. Thus the objection to the prior large and heavy duplicating routers has been overcome by the present invention, since the present router can be used without requiring additional floor space, merely by attaching it to equipment already in the shop. Such an arrangement reduces materially the floor area needed in a diversified shop.

It is another object of the present invention to provide in such a router improved mechanisms for enabling highly efficient and satisfactory duplicating routing to be carried out.

Other objects and features will appear from the following description and claims, and from an inspection of the accompanying drawings, which illustrate one embodiment of the invention:

Figure 1 is a side elevation of the duplicating router attachment of the present invention mounted on a milling machine and operating on several workpieces.

Fig. 2 is a front elevation of the router and machine of Fig. 1.

Fig. 3 is an enlarged front elevation of the duplicating router attachment.

Fig. 4 is a top view of the router of Fig. 3, a portion being shown in section on the line 4—4 of the preceding figure.

Fig. 5 is an enlarged fragmentary vertical sectional view showing details of the supporting mechanism, portions being shown in elevation and other portions being broken away and shown in section to reveal the construction more clearly.

Fig. 6 is an enlarged fragmentary vertical sectional view taken in a plane at right angles to that of Fig. 5, a portion of the structure being shown in elevation.

Referring to Fig. 1, there is shown a conventional type of milling machine having a base plate 10, frame 11, knee or bed 12 movable vertically by a jack screw 13 operated by a hand wheel 14, said bed carrying a table 15 laterally movable on the bed by means of a hand wheel 16. The frame 11 carries at its uppermost portion 11a the usual overhang-arm 17 adjustable therein by means of clamp screws 18, 18. As shown, the usual tools have been removed from the machine spindle, as well as the center carrier usually mounted on the arm 17.

According to the present invention there is provided a duplicating routing unit for attachment to the arm 17 of the milling machine, said router being supported, as shown in Figs. 1 and 2, directly over the table 15 and in position to perform operations upon workpieces 19, 19 placed upon said table.

The details of the embodiment herein shown may be best understood by first going over the general organization of parts, and their general operation.

Referring principally to Figs. 3 and 4 (Fig. 4 being a top view of Fig. 3) there is shown a main slide structure comprising a substantially cylindrical casing 20 carried by a tubular sleeve 21 which is rigidly attached to the arm 17 of the milling machine, the casing being slidable longitudinally of the sleeve. The casing 20 has a depending central portion (marked 20a in Fig. 5) which carries a rigid secondary slide structure comprising a pair of substantially similar tubular elbows 22 and 23, a bar 24 slidably passing through and supported by the depending central portion of the casing, and H-shaped frame 25, which entire structure is therefore movable laterally of the casing. The elbow 23 is hidden in Figs. 3 and 4, in which views the secondary slide structure is shown shifted to the right from central position relative to the main slide structure, but this elbow is shown in Fig. 1.

By this arrangement the rigid secondary slide structure including the bar or beam 24 can be moved both laterally and longitudinally of the conventional cylindrical overarm 17, and therefore can be moved in any horizontal direction relative to said arm. As hereinafter explained, each of the tubular elbows 22 and 23 serves as a mount for a carrier of a router unit having a cutter 26 driven by a motor 27, and the H-frame 25, at the cross-bar of the H, serves as a mount for a carrier of a guiding stylus 28.

Means, hereinafter described, being also provided for concurrently moving the cutters and the stylus in a vertical direction, the stylus can be caused to traverse any desired pattern, and the cutters will be similarly moved so as to duplicate the pattern on the workpieces held on the table 15 which latter, in the present instance, is stationary.

As seen in Fig. 5, the arm 17 carries the sleeve 21 which fits closely over said arm and is fastened thereto by one or more set screws 29. The sleeve 21 passes through and slidably supports the upper portion of the casing 20, said sleeve having on its outer surface a plurality of longitudinal grooves 30 and 30a which serve respectively as races for a plurality of roller bearings 31 and 31a mounted within the casing, there being two sets of such bearings, one set at the front of the casing and the other at the rear of the casing.

For the purpose of preventing the casing from turning on the sleeve, the grooves 30a, of which two are shown, are rectangular in section and are adapted to receive and closely confine the peripheral and side bearing portions of the roller bearings 31a; also the grooves 30, four in number, are V-shaped and are adapted to engage the peripheral bearing portions and side portions of the bearings 31, which bearings are disposed in parallel non-radial planes.

The roller bearings 31 and 31a, Fig. 6, are carried in yokes 33 and 33a respectively, each of said rollers turning on a pivot screw, as at 34, and said yokes being mounted in recesses within the casing 20 and being held in adjusted position by retaining screws 35 having check-nuts 36.

Thus the main slide structure comprising the casing 20 is mounted on the sleeve 21 for substantially frictionless movement longitudinally thereof, and turning of the casing about said sleeve is prevented by the engagement of the roller bearings 31 and 31a respectively with the grooves 30 and 30a.

For the purpose of carrying the secondary slide structure including slide-beam 24, the depending portion 20a of the casing 20, Figs. 5 and 6, and which portion 20a is substantially cylindrical about an axis at right angles to that of the over-arm 17, has a central opening therethrough in a direction at right angles to the opening of the upper casing portion, and has a plurality of roller bearings 37 and 37a mounted in yokes 38 and 38a held in recesses within the casing in the manner described above. Two sets of such bearings are provided, one set at each end of the opening in the casing (see Fig. 6).

The roller bearings 37 and 37a ride respectively in longitudinal grooves or races 39 and 39a, Fig. 6, provided in the outer cylindrical surface of the slide-beam 24, the grooves 39 being rectangular in section, and the grooves 39a being V-shaped. Thus the slide-beam 24 is supported by the casing 20 for axial movement therein, turning of said bar in the casing being prevented by virtue of the grooves 39 and 39a.

As seen in Figs. 4, 5 and 6, the slide-beam 24, in both portions thereof beyond the depending portion 20a of the casing 20, is engaged by collars integral with the inner ends of the side-bars 25a of the H-frame 25, each of said collars being secured to said beam by a plurality of set screws 41 (see Fig. 6). As above, one end of the slide-beam 24 carries the tubular elbow 22, this elbow being clamped to the beam as shown in Fig. 4; and the other end of the beam 24 supports the elbow 23 in a similar manner as indicated in Fig. 1.

Each of the elbows 22 and 23 supports a vertical tubular housing 43 for carrying a router unit, each elbow being provided at its forward end with a circular flange which is adjacent a similar flange 43a carried by the housing 43, both flanges having index markings thereon for locating the housing in true vertical position, relative to the table and the work carried thereby. The router units carried by the housings 43, 43 are exactly similar in all respects. Referring to Fig. 2, each housing 43 carries a quill 44 which is slidably mounted in the housing, the quill in turn carrying a spindle 45 suitably journaled therein by anti-friction bearings. The spindle 45 is adapted at its lower end to receive and hold the routing cutter 26, and is keyed at its upper portion to a stepped pulley 46, see Fig. 1, so as to be axially movable therein.

Each spindle 45 receives power from its electric motor 27 by means of a stepped pulley 47 carried on the lower end of the motor shaft and belt-connected with the stepped spindle pulley 46 so that various cutter speeds may be obtained.

In each router unit, for the purpose of lowering and raising the spindle 45, the quill 44 is provided with a rack 48 which travels in a slot 49 in the housing 43; the rack 48 being in engagement with a pinion 50 carried by a shaft 51, which latter is journaled in lugs 52 extending from the housings 43, and is also journaled in bearings 53 carried at the outer ends of the side-bars of the H-frame 25. Thus there is provided an organization for concurrently moving the spindles 45, 45 and therefore the cutting tools 26, 26 in a vertical direction, when the shaft 51 is rotated in one direction or the other.

The cross-bar of the H-shaped frame 25 has bolted to it a circular plate 54 which supports a vertical cylindrical housing 55, there being slidably carried in the latter a quill 56 which in turn carries the guiding stylus 28. The quill 56 is provided with a rack 57 passing through a slot 58 in the housing 55, said rack engaging a pinion 59 carried on the shaft 51. Thus the stylus 28 will move concurrently with the routing tools 26, 26 in a vertical direction, and also, since the tools 26, 26 and stylus 28 are all carried by the H-shaped frame 25, concurrent horizontal movement of said stylus and tools is provided for.

For the purpose of raising or lowering the tools and stylus, the shaft 51 is provided with hubs 60 in each of which there is a plurality of radially disposed cylindrical sockets 61 adapted to receive a hand bar 62 for turning the shaft 51.

Each of the casings 43, 43 carries a hand wheel 63 for adjusting the quills carrying the routing cutters, for close work.

Movement of the cutters and stylus in any horizontal direction is effected by a lever 64, see Figs. 5 and 6, the upper end of which is reduced and cylindrically shaped to pass through an aperture in a bracket arm 65 carried at the rear end of the sleeve 21. The lever 64 is held in the bracket arm 65 by means of a spring 66, a washer 67, and a cotter pin 68 as shown, and said lever extends downwardly below the casing 20 and extends forwardly in a horizontal direction, carrying at its extremity a handle 69. On the horizontal portion of the guiding lever 64 there is provided a self-aligning anti-friction bearing 70 carrying a connector stud 71 which is attached to a bracket 72 in turn secured to the yoke 25, (see Fig. 6). Thus the lever 64 fulcrums on the bracket 65.

It will be seen that when the handle 69 is pulled forwardly, in the direction of the arrow of Fig. 5, it will cause forward movement of the casing 20 on the stationary sleeve 21, the reverse also being true, and when the handle is moved to either the left or right (see Fig. 6) it will cause movement of the secondary slide structure including the beam 24 and H-frame 25 to either the left or right relatively to the casing, the lever 64 fulcruming on the bracket 65. Should the handle 69 be urged in any other horizontal direction, the casing 20 will move on the sleeve 21 and the secondary slide structure will also move relatively to the casing 20. Therefore the cutters 26, 26 and stylus 28 can be guided by means of the handle 69 in any horiontal direction, and said cutters and stylus can be lowered or raised by means of the hand bar 62.

Forward movement of the casing 20 on the sleeve 21 is limited by a set collar 73 carried by the sleeve near the forward end thereof, and rearward movement is limited by a similar collar 74. Sliding movement of the bar 24 is also limited in each direction by the side-bars of the H-frame 25.

For the purpose of locking the casing 20 in any position on the sleeve 21, the former is provided with a friction lock head 75 operated by a hand wheel 76 attached to a screw 77, the hand wheel and screw being carried by a plate 78 suitably secured to the casing. Likewise the bar 24 is locked in any adjusted position by a similar friction lock controlled by a hand wheel 79, as in Fig. 5.

In order to duplicate any object of regular or irregular contour and shape, the object is secured to the table 15 of the milling machine in the position shown at 80, Fig. 2, and the two pieces of stock 19, 19 are secured to the table beneath the cutters 26, 26. The motors 27, 27 are energized and the cutters and stylus are moved by means of the guiding lever 64 and the hand bar 62 so that the stylus 28 follows the surface and depth contour of the object or pattern 80. The cutters 26, 26 will thus also be guided in the directions taken by the stylus 28, and in removing material from the workpieces 19, 19 the cutters will duplicate the pattern 80. If desired, the operator can cause the cutters 26, 26 to cut deeply into the workpieces 19, 19 by bearing upwardly on the bar 62, or, depending on the nature of the work, the pressure of the cutters can be regulated entirely by the stylus 28 in following the contour of the pattern. The speed of the cutters 26, 26 can be varied by shifting the belts on the stepped pulleys 46 and 47.

It should be noted that when it is desired to duplicate a pattern of large dimension, recourse can be had to removal of the collars 73 and 74 from the sleeve 21, and also adjustment of the table 15 can be effected by means of the hand wheels 14 and 16; in addition, the entire routing attachment may be moved forwardly or backwardly by loosening the clamping screws 18, 18 and shifting the arm 17. Thus a pattern may be duplicated even though it requires more extensive movement either vertically or horizontally than is permitted the cutters 26, 26 and stylus 28 by the routing attachment itself.

Nevertheless, axial advance of the cutters 26 to the workpieces 19 is either automatic, by the weight of the vertically movable mountings of the cutters and the stylus 28; or by manually applied pressure exerted by direct thrust, that is, in the present case, by manual rotation of the shaft 51 and by pinion-and-rack connections between this shaft and the spindles of the cutters. Unlike previously proposed attachments for standard milling machines or the like, the progress of the routing is not attempted to be controlled by raising and lowering the knee or bed 12 for the worktable, which would be impracticable in view of the weight of these parts, which are so massive and heavy as to require the interposition of screw means between the same and a hand-wheel actuator therefor. Thus the present invention provides an attachment readily applicable to the cylindrical overarm of a standard milling machine or the like, and yet an attachment for a standard machine which may be operated with that sensitivity of manual "feel" required to properly handle any cutting or routing of a workpiece from a fixed pattern, and particularly required to properly handle a profiling operation.

Another feature of the invention is that a profiling attachment is provided as above, and adapted to operate according to a one-to-one ratio between a master pattern and a copy to be reproduced therefrom, yet an attachment operable in such manner that the profiling is accomplished through movements of the stylus both over the pattern and depthwise of the pattern and as a result of corresponding movements of the cutter. In other words, the workpiece is always fixed during the cutting operation, and the profiling is not sought to be done either by moving the cutter axially while shifting the workpiece laterally of the cutter axis, or by shifting the cutter laterally of its axis while moving the workpiece axially of the cutter, as previously proposed, but which is unsuitable for finely accurate profiling. For the kind of work just mentioned it is important that all relative movements between the cutter and the workpiece be performed by the cutter.

Variations and modifications may be made within the scope of this invention and portions of the improvements may be used without others.

I claim:

1. In an attachment of the character described, the combination of a casing; means for mounting the casing on the cylindrical overarm of a milling machine for movement longitudinally thereof but against rotational movement thereon; a frame; means for mounting the frame on the casing for movement laterally of the direction of the casing movement; a plurality of cutter spindles; means for mounting the cutter spindles on the frame at opposite sides of the casing for simultaneous axial movement, and for turning movement; a stylus; means for mounting the stylus on the frame between the cutter spindles for movement simultaneously with the axial movement of the cutter spindles; and motivation means mounted on the frame for driving the cutter spindles.

2. In an attachment of the character described, the combination of a casing; means for mounting the casing on the cylindrical overarm of a milling machine for movement longitudinally thereof but against rotational movement thereon; a substantially elongate frame; means for mounting the frame, intermediate its ends, on the casing for movement laterally of the direction of the casing movement; a pair of cutter spindles; means for mounting the spindles, one at each end of the frame, for simultaneous axial movement, and for turning movement; a stylus; means for mounting the stylus on the frame at a point intermediate the ends thereof for movement simultaneously with the axial movement of the cutter spindles; and a pair of motivation means, one for each spindle, one of said means being mounted at each end of the frame.

3. In an attachment of the character described, the combination of a casing; means for mounting the casing on the cylindrical overarm of a milling machine for movement longitudinally thereof but against rotational movement thereon; a frame; means for mounting the frame on the casing for movement laterally of the direction of the casing movement; a plurality of cutter spindles; means for mounting the cutter spindles on the frame to be substantially perpendicular to the bed of the milling machine, said mounting means providing for simultaneous axial movement of the spindles, and for independent turning movement thereof; a stylus; means for mounting the stylus on the frame between and substantially parallel with the cutter spindles for movement simultaneously with the axial movement of said spindles; and motivation means mounted on the frame for driving the cutter spindles.

4. In an attachment of the character described, the combination of a casing; means for mounting the casing on the cylindrical overarm of a milling machine for movement longitudinally thereof but against rotational movement thereon; a frame; means for mounting the frame on the casing for movement laterally of the direction of the casing movement; a plurality of cutter spindles, each removably carrying a cutting tool; means for mounting the cutter spindles on the frame for simultaneous axial movement, and for turning movement; a stylus; means for mounting the stylus on the frame between the cutter spindles and for movement simultaneously with the axial movement of the cutter spindles; and motivation means mounted on the frame for driving the cutter spindles.

5. In an attachment of the character described, the combination of a casing; means for mounting the casing on the cylindrical overarm of a milling machine for horizontal movement longitudinally thereof but against rotational movement thereon; a frame; means for mounting the frame on the casing for horizontal movement laterally of the direction of the casing movement so that the frame can move horizontally in all directions; a material-working device; means for mounting said device on the frame for vertical movement relatively thereto, and for movement horizontally with the frame; a stylus; and means for mounting the stylus on the frame for simultaneous movement with the material-working device.

6. A profiling attachment for a milling machine or the like, comprising a main slide structure, said structure including a casing having upper and lower portions, said casing portions in the form of collars the openings through which are substantially at right angles to each other; means for attaching said slide structure to the overarm of said machine by way of the opening through the upper collar to permit movement of said slide structure longitudinally of said overarm within predetermined limits, said means including a sleeve for girthing said overarm and extending through the opening through the upper collar of said slide structure, means carried by the sleeve for clamping the same fast on said overarm, and means including revoluble elements between said sleeve and said upper collar for providing an anti-friction slide coupling between said slide structure and said sleeve and also for keying said slide structure against rotational movement on said sleeve; a secondary slide structure including a slide-beam passing through the opening through the lower collar of the main slide structure; means including revoluble elements between said sleeve and said lower collar for providing an anti-friction slide coupling between the two slide structures and also for keying said beam against rotational movement in the main slide structure; a cutter spindle on the secondary slide structure; a stylus on the secondary slide structure; manually operable means for axially simultaneously moving both the stylus and the cutter; and manually operable means for moving either of the slide structures, or both such structures simultaneously, as the case may be, for thereby translating the stylus and cutter universally laterally of the axes thereof.

7. In an attachment of the character described adapted to be used on a machine having a normally stationary work-supporting surface and a spaced overarm; a movable unit mounted for movement on the overarm but held thereon against rotation; a cutting tool; a stylus adapted to cooperate with a pattern carried by a normally stationary supporting surface; and means for mounting the cutting tool and stylus on the movable unit for simultaneous movement laterally and vertically with respect to the workpiece and pattern with the cutting tool and stylus always maintaining their original angle with respect to the surface of the workpiece and pattern.

8. In an attachment of the character described adapted to be used on a machine having a normally stationary work-supporting surface and a spaced overarm; a casing; means for mounting the casing on the overarm against rotation thereon; a cutting tool; a stylus adapted to cooperate with a pattern carried by a normally stationary supporting surface; and means for mounting the cutting tool and stylus on the casing for simultaneous movement laterally and vertically with respect to the workpiece and pattern with the cutting tool and stylus always maintaining their original angle with respect to the surface of the workpiece and pattern, said mounting means for the casing comprising a sleeve secured to the overarm and a key-and-slot connection between the sleeve and casing.

9. In an attachment of the character described adapted to be used on a machine having a normally stationary work-supporting surface and a spaced overarm; a casing; means for mounting the casing on the overarm against relative rotation thereon; a cutting tool; a stylus adapted to cooperate with a pattern carried by a normally stationary supporting surface; and means for mounting the cutting tool and stylus on the casing for simultaneous movement laterally and vertically with respect to the workpiece and pattern with the cutting tool and stylus always maintaining their original angle with respect to the surface of the workpiece and pattern, said means for mounting the casing on the overarm comprising a sleeve having longitudinal grooves thereon secured to the overarm and roller bearings mounted on the casing and engaging the slots in the sleeve.

10. In an attachment of the character described adapted to be used on a machine having a normally stationary work-supporting surface and a spaced overarm; a casing mounted on the overarm for longitudinal movement but held from rotation thereon; a cutting tool; a stylus adapted to cooperate with a pattern carried by a normally stationary supporting surface; means for mounting the cutting tool and stylus on the casing for simultaneous movement laterally and vertically with respect to the workpiece and pattern with the cutting tool and stylus always maintaining their original angle with respect to the surface of the workpiece and pattern; and manual means pivotally mounted with respect to the overarm and connected to the mounting means for imparting movement to the cutting tool and stylus.

11. In an attachment of the character described adapted to be used on a machine having a normally stationary work-supporting surface and a spaced overarm; a casing mounted for lateral movement on the overarm but held against rotation thereon; a plurality of spaced cutting tools, one for each workpiece; a stylus adapted to cooperate with a pattern carried by a normally stationary supporting surface; and means for mounting the cutting tools and stylus on the casing for simultaneous movement laterally and vertically with respect to the workpiece and pattern with the cutting tool and stylus always maintaining their original angle with respect to the surface of the workpiece and pattern, whereby the plurality of cutting tools will operate simultaneously in the same manner upon a plurality of workpieces.

12. In an attachment of the character described adapted to be used on a machine having a normally stationary work-supporting surface and a spaced overarm; a casing mounted for movement along the overarm but held thereon against relative rotation; a plurality of spaced cutting tools, one for each workpiece; individual driving means for each of the cutting tools; a stylus adapted to cooperate with a pattern carried by a normally stationary supporting surface; and means for mounting the cutting tools and stylus on the casing for simultaneous movement laterally and vertically with respect to the workpiece and pattern with the cutting tool and stylus always maintaining their original angle with respect to the surface of the workpiece and pattern, whereby the plurality of cutting tools will operate simultaneously in the same manner upon a plurality of workpieces.

13. In an attachment of the character described adapted to be used on a machine having a normally stationary work-supporting surface and a spaced overarm; a casing having a plurality of spaced passages extending at substantially right angles to one another, said casing being mounted on the overarm for limited longitudinal sliding movement thereon with the overarm extending through one of the passages; a secondary slide mounted in the other passage of the casing for limited longitudinal sliding movement; a cutting tool mounted on the secondary slide; a stylus mounted on the secondary slide for simultaneous movement with the cutting tool; means for imparting vertical movement to the stylus and cutting tool with respect to the slide; and means for moving the stylus and cutting tool in either of the longitudinal sliding directions, separately or simultaneously whereby the stylus and cutter can be universally translated laterally of the axis thereof.

CARL H. JOHNSON.

CERTIFICATE OF CORRECTION.

Patent No. 2,118,514. May 24, 1938.

CARL H. JOHNSON.

It is hereby certified that error appears in the printed specification of the above numbered patent requiring correction as follows: Page 4, second column, line 54, claim 9, strike out the word "relative"; and that the said Letters Patent should be read with this correction therein that the same may conform to the record of the case in the Patent Office.

Signed and sealed this 2nd day of August, A. D. 1938.

(Seal)

Leslie Frazer,
Acting Commissioner of Patents.